July 23, 1968
H. W. BUSEY
3,394,264
ZERO SPEED TACHOMETER WITH ANTI-JITTER ARRANGEMENT
Filed July 7, 1965
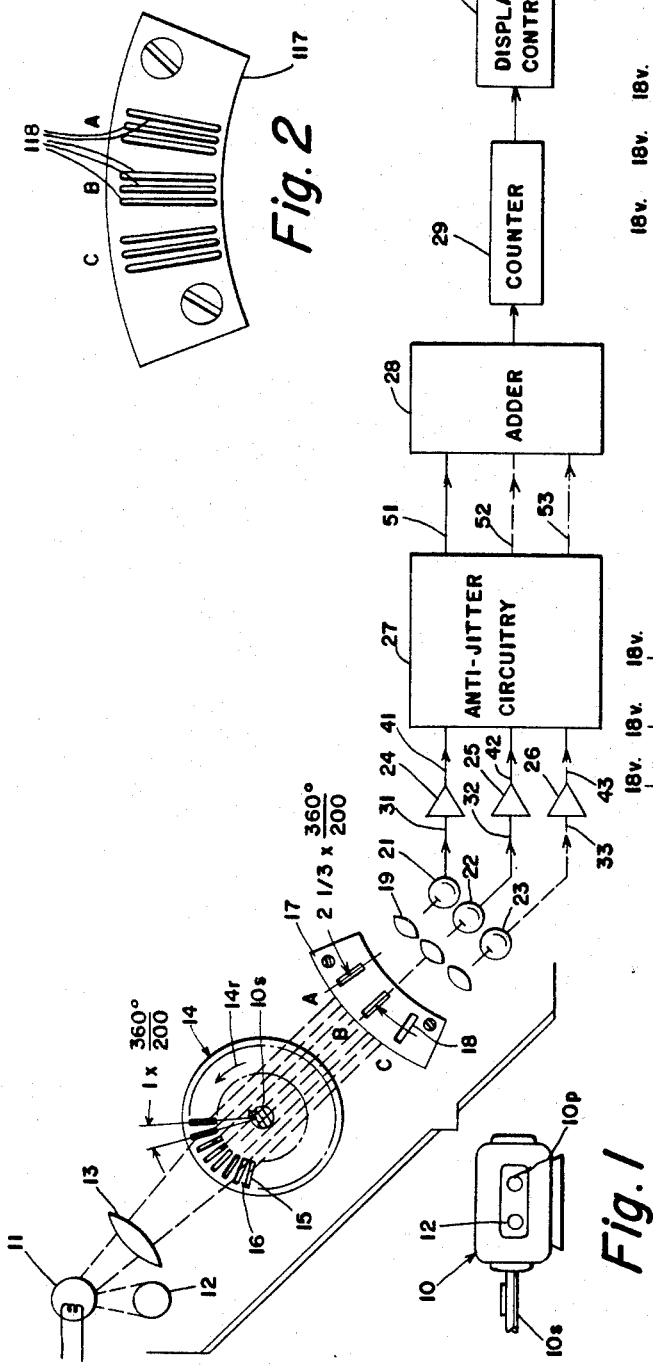
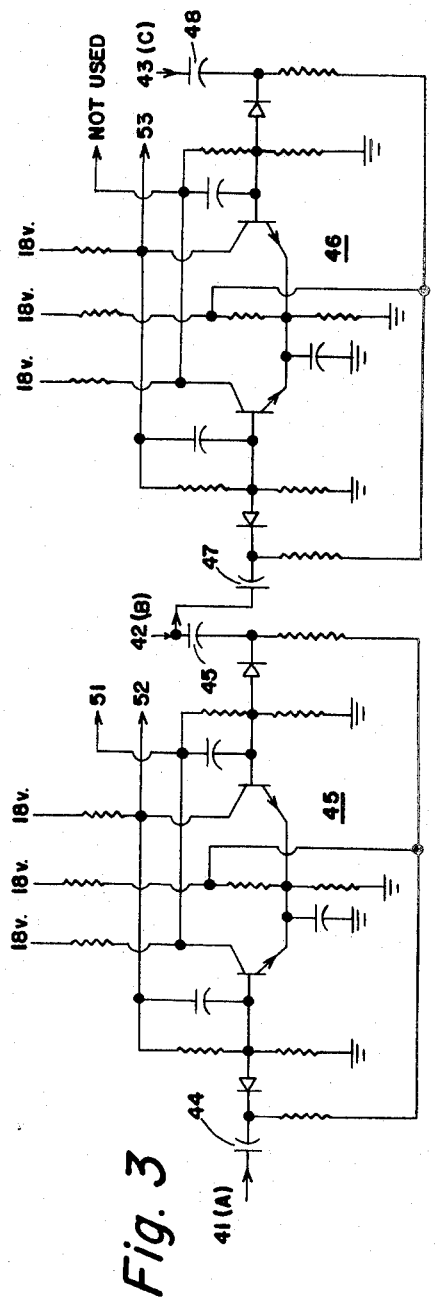
INVENTOR.
HUGH W. BUSEY
BY
Richard MacCutcheon
ATTORNEY

United States Patent Office 3,394,264
Patented July 23, 1968

3,394,264
ZERO SPEED TACHOMETER WITH ANTI-JITTER ARRANGEMENT
Hugh W. Busey, Chagrin Falls, Ohio, assignor to Avtron Manufacturing Inc., Cleveland, Ohio, a corporation of Ohio
Filed July 7, 1965, Ser. No. 470,076
5 Claims. (Cl. 250—233)

The present invention relates to tachometers for apparatus involving near zero shaft speeds as for precise machine tool positioning.

Many prior devices have utilized a light source shining through apertures of a rotatable disc upon one or more photocells or other photosensitive devices to generate pulses whose rate is indicative of rotational speed. Up to a point, the more slots there are, the more sensitive the device becomes at near zero speeds, but a limit is reached if the slots are so numerous that each becomes too small to pass sufficient light to operate a photocell. Also, as the number of slots is increased, they are so close together that error is introduced by mere plant vibration (jitter) swinging the disc and its apertures to and fro to provide an apparent indication of rotational speed when the machine speed should actually be read out as zero.

Photoelectric tachometers presently available have sought to avoid these deficiencies by utilizing plural coaxial arcuate tracks of alternate transparent and opaque sectors, but this has had the disadvantage of adding to size and expense of the over-all apparatus, and does not inherently provide "anti-jitter" features, nor direction (of rotation) sensing, and imposes limitations of rotary speed since, for a unit with a large number of pulses per revolution, the rotational speed is limited by the frequency response of the photocell transducer means while, for a unit designed for higher rotational speed ranges, there is a limited number of p.p.r., hence poor sensitivity at low speed.

It is an object of the present invention to provide simple and inexpensive means for overcoming the above mentioned difficulties.

Another object is to provide a near zero speed tachometer in which a single unit is readily adaptable for readout of a relatively wide range of driving machinery maximum speeds while also capable of accurate speed readout near zero and of discriminating against vibration.

Other objects and advantages will become apparent and the invention may be better understood from consideration of the following description taken in connection with the accompanying drawing in which:

FIG. 1 is a simplified diagram indicating components useful in practicing the invention;

FIG. 2 is a front view of an assumed stationary mask 117 which represents a preferred modification of the simpler mask 17 of FIG. 1;

FIG. 3 is a schematic electrical circuit diagram for one form of anti-jitter circuitry.

Referring now to FIG. 1, a near zero speed pulse generator indicated generally at 10 has a shaft 10s assumed connected to machinery whose speed is to be displayed or controlled. The generator is provided with a light source such as an incandescent lamp 11 and may have a transparent window 12 for indicating whether the lamp is on while protecting the optical system against dust, dirt, grease, etc. The generator is also advantageously provided with a plug 10p for an interconnecting cable (not shown) leading to pulse signal processing devices as described later herein.

Light from lamp 11 is focused by a convex lens 13 upon an arcuate portion of a single arcuate disc 14 which is driven by the shaft 10s. The rotatable disc 14 has a single arcuate row or track of transparent slots 15 separated by opaque areas 16. Next the light passes through a stationary mask 17 which, in the illustrated embodiment, has what I will call (by mechanical analogy to electrical terminology) a three phase arrangement of light transmitting apertures or slots 18. For clarity, the drawing is not to scale but for a preferred embodiment it assumes that there are two hundred uniformly spaced slots 15 in rotating disc 14, so that they are spaced 1.8° between centers. Then three phase slots 18 at A, B and C in the stationary mask 17 may be spaced by an integral multiple (as shown, one) times 1.8 plus a fraction equalling one over the number of phases (or one over a multiple of the number of phases) times 1.8 such as 4.2° between centers. Next, or at least for the preferred embodiment later to be described in connection with FIG. 2, the light from the various phase slots 18 passes through a respective one of condensing lenses 19, and then it ultimately reaches photocells 21, 22, 23 in the form of pulses of light. By use of straight lines for aperture edges (as shown in the drawing), straight lines cross straight lines so that sharp pules of light are produced for causing relatively fast response.

The output of the photocells 21–23 is passed through respective amplifiers 24, 25 and 26 which may each be of conventional type, for example provided with plural transistors and each providing an output in the form of negative pulses, as is assumed for the later description of FIG. 3. Next, as shown in FIG. 1, the variously phased signals are passed through anti-jitter circuitry 27, an example of which is shown in FIG. 3, then through an adder indicated by the block 28 (see FIG. 1). Counter 29 is used to provide an output signal responsive to pulse rate, and this signal is fed to a unit 30 which may act as a display (e.g., of r.p.m.) or as a control unit (e.g., for feedback control of the machinery driving the tachometer generator 10), or both. The word "counter" is meant to be merely illustrative rather than limiting. In some applications the device 29 might "count" pulses over a fixed time period (as indicative of speed); in other applications it might be preferable to have the device 29 measure pulse width (as indicative of almost instantaneous rather than average speed, particularly during periods of acceleration or deceleration).

In operation with the arrangement of FIG. 1, with an assumed direction of rotation as indicated by the arrow 14r, alignment of slots of rotating disc 14 and stationary segment 17 will give an ABCABC, etc. response. Rotation in the opposite direction will give an ACBACB, etc. response. By contrast, unsought for vibration or jitter will give a very random sort of response such as AACABA, etc. in the photocells 21–23, hence in lines 31, 32, 33 leading to the respective amplifiers 24–26, and in lines 41, 42, 43 shown leading from the amplifiers to the anti-jitter circuitry.

Referring now to FIG. 2, a stationary mask 117 is shown provided with three phase-groups of slots 118, there being three slots 118 for phase A with the spacing between slot centers for the particular phase group being assumed the same as the spacing between slot centers on a cooperating rotatable disc. Other slots 118 are similarly spaced apart in the group of slots for phase B. The trailing slot of phase A is desirably spaced from the leading slot of phase B two and one-third times the spacing between slots of any one phase group. Adjacent slots of the group representing phase C are similarly spaced from one another by a spacing of $n$ while the nearest slots of B and C are separated by $2\frac{1}{3}$ $n$.

In operation with the arrangement of FIG. 2, the use of three slits 118 for each phase provides a multiple light gate for each phase and makes larger quanta of light obtainable than with single slit per phase operation. Thus, substitution of the nine slit mask 117 of FIG. 2 (e.g., between rotating disc 14 and condensing lenses 19 of FIG. 1) provides greater dynamic response and faster leading and trailing edges of the pulses.

In FIG. 3, lead 41 (phase A) feeds through a 220 mmf. capacitor 44 to a first multivibrator indicated generally at 45. The other input of 45 is fed by line 42 (phase B) through a 220 mmf. capacitor 45. In more or less conventional terminology, a signal through 41 will cause the vibrator to flip and a signal through 42 can then cause it to flop but if there is a first pulse from 41 and then (without a pulse from 42) a second pulse from 41, the second pulse is ineffective in both of the output lines 51 and 52. Similarly, in a second multivibrator indicated generally at 46, pulses from line 42 pass through capacitor 47 so that their time of arrival is compared with that of pulses from phase C through line 43 and capacitor 48.

It should be understood that the illustration of the multivibrators of FIG 3 is merely exemplary and not intended to represent the present invention per se. Many other equivalents, mechanical, hydraulic or electrical, could be used instead. For example, two coil latching relays could be used instead of multivibrators, or the anti-jitter circuitry would be furnished fairly effectively by using only one "flip-flop," for example, by dropping the lines 33 and 43 which are therefore shown dashed in FIG. 1. Also, once the anti-jitter circuitry has served its function it may not be necessary to call all of the separate phase lines any further and that is why, in FIG. 1, 52 is shown dashed and line 53 is shown dash-dot. In other words, if there are 200 slots in the rotating disc, even though there be a polyphase arrangement in the stationary disc 17 (to provide the anti-jitter feature) only a single phase 51 need be carried to the adder 28 (which now serves no function except to make the apparatus more universal) and the display 30 will be responsive to 200 pulses per revolution. Conversely if only lines 51 and 52 are taken to the adder (which may be of conventional circuitry, hence is not described) the display or control 30 is responsive to 400 pulses per revolution, while if all three lines 51–53 are used the output corresponds to 600 pulses per revolution.

There is thus provided apparatus of the class described capable of meeting the objects above set forth. The anti-jitter feature prevents vibration produced output signals, and the unit is extremely accurate and can be adapted to cover a wide range of speeds all the way from real zero to 5000 r.p.m., or more, simply by making the number of phases greater than three. While many modifications are possible and there could be a two phase arrangement with spacing of 90° or 180° or 120° or whatever is desired, the equipment as described is often advantageous in being direction sensitive (by merely adding a conventional phase sequence sensor), but there is still the advantage that there is only a single arcuate row of slots in each of rotating disc and stationary masking plate, and there still is the advantage of providing a great number of pulses per second, for example up to 100,000 for three phase, and five times as many for fifteen phase. At the same time the equipment is versatile in allowing a choice of the number of pulses per revolution from a given disc and mask, the p.p.r. being easily changed by using as many phased outputs as desired.

While I have illustrated and described particular embodiments, various modifications may obviously be made without departing from the true spirit and scope of the invention which I intend to have defined only by the accompanying claims taken with all reasonable equivalents.

I claim:
1. A photoelectric type tachometer comprising:
    a source of light,
    cooperable rotating disc and stationary mask members each having not more than one arcuate track of light transmitting apertures, one of said members having a spacing of $n$ angular measurement between centers of adjacent apertures, and the other of said members having a spacing of $(X+1/Y)$ $n$ between centers of at least some of adjacent apertures, where X is a whole number and Y is a whole number, and
    plural photosensitive devices arcuately spaced apart and respectively arranged responsive to light from said source as it passes through aligned apertures of disc and mask in one phase relation at the arcuate position of one photosensitive device and in a different phase relation at the arcuate position of another photosensitive device whereby to provide a polyphase output in the form of out of phase trains of pulses.

2. A tachometer as in claim 1 further characterized by the second mentioned apertured member having plural groups of plural slots, the slots of each group being separated by $n$ degrees between centers whereby to provide a multiple light gate for each photosensitive device by allowing more light quanta for each pulse output while the leading slot of one group is separated from the trailing aperture of an adjacent group by a distance between centers of $(X+1/Y)$ $n$, the photosensitive devices being respectively arranged to respond to such different groups of slots.

3. A tachometer as in claim 1 further characterized by there being three photosensitive devices and by "$X+1/Y$" being equal to 2⅓.

4. A photoelectric type tachometer as in claim 1 further comprising means including an adder and removable connections thereto from the respective photosensitive devices for selectively deriving an output alternatively from one or from more of said photosensitive devices whereby to change the response of said photoelectric type tachometer.

5. A photoelectric type tachometer as in claim 1 having anti-jitter circuitry means comprising at least one flip flop arranged differentially responsive to said plural photosensitive devices for eliminating false readings due to vibration.

References Cited
UNITED STATES PATENTS
| | | | |
|---|---|---|---|
| 2,747,797 | 8/1951 | Beaumont | 250—233 X |
| 2,796,534 | 6/1957 | Williams | 250—233 X |

FOREIGN PATENTS
940,167 10/1963. Great Britain.

ROBERT SEGAL, *Primary Examiner.*